United States Patent [19]
Choi

[11] Patent Number: 5,764,621
[45] Date of Patent: Jun. 9, 1998

[54] OPTICAL DISC WITH A PLURALITY OF RECORDING LAYERS

[75] Inventor: Yang-Oh Choi, Seoul, Rep. of Korea

[73] Assignee: Daewoo Electronics Co., Ltd., Seoul, Rep. of Korea

[21] Appl. No.: 550,790

[22] Filed: Oct. 31, 1995

[30] Foreign Application Priority Data

Oct. 31, 1994 [KR] Rep. of Korea ............ 94-28328

[51] Int. Cl.$^6$ ............................................. G11B 3/70
[52] U.S. Cl. ............................. 369/286; 369/283
[58] Field of Search ........................... 369/286, 283, 369/280, 282, 284, 288; 360/131, 114, 134–135; 428/13, 64.3, 65.5, 76, 164, 323, 332, 336, 412, 416

[56] References Cited

U.S. PATENT DOCUMENTS

| | | | |
|---|---|---|---|
| 4,547,444 | 10/1985 | Bell et al. | 430/11 |
| 5,045,373 | 9/1991 | Sens et al. | 428/64 |
| 5,093,174 | 3/1992 | Suzuki et al. | 369/286 |
| 5,202,880 | 4/1993 | Lee et al. | 369/286 |
| 5,214,636 | 5/1993 | Ishikawa et al. | 369/286 |
| 5,580,633 | 12/1996 | Kuwahara et al. | 428/64.3 |

FOREIGN PATENT DOCUMENTS

6-60450  3/1994  Japan ..................... 369/286

Primary Examiner—Allen Cao
Attorney, Agent, or Firm—Fish & Richardson P.C.

[57] ABSTRACT

When a laser beam from an optical pickup is incident on an optical disc, the optical disc comprises a protective layer, a first recording layer having a desired pattern, a coating layer by which one part of the laser beam is reflected with a predetermined reflectance and through which the other part is transmitted, a dielectric layer, a second recording having a desired pattern and formed under the dielectric layer, and a reflective layer by which the laser beam is totally reflected, according to that order from a top of the disc. The disc has the coating layer having the predetermined reflectance between the first and second recording layers, thereby the light amount of the laser beam reflected from the coating layer for reading information of the upper first recording layer becomes larger than the light amount of the laser beam transmitted through the coating layer for reading information of the lower second recording layer. Since the difference between the light amounts of the two recording layers generates the change of amplitude of RF signals detected at photodetector of the optical pickup device, it is possible to separately record and/or reproduce the respective recording layers of the optical disc.

10 Claims, 2 Drawing Sheets

OPTICAL DISC WITH A PLURALITY OF RECORDING LAYERS

BACKGROUND OF THE INVENTION

1. Field of the Invention

The present invention relates to an optical disc with a plurality of recording layers, and more particularly to an optical disc with a plurality of recording layers capable of recording/reproducing information recorded with a high density using an optical recording/reproducing device of a simple construction.

2. Description of the Prior Art

Information reproducing/recording systems for using optical discs such as laser discs or compact discs have been developed in recent days. Higher data densities are desirable for a variety of reasons, including the ability to make compact discs smaller and to enable the recording of High Definition Television (HDTV) compatible video discs.

One method considered possible for achieving a high data density in an optical data medium was to focus the read laser to an even finer beam diameter, but the maximum practical limit to the numerical aperture (NA) of an objective lens which focuses the laser is approximately 0.6. It would also be possible to obtain a similar result by shortening the laser wavelength, but a wavelength of a practical semiconductor laser is limited at the present.

A second method for achieving a high density is to use V-grooves in the optical disc, such as disclosed in U.S. Pat. No. 4,569,038 issued to Nagashima et al. (Feb. 4, 1986).

The capacity of the data recordable on an optical disc using conventional technologies is determinable. For an optical disk housed in a 3.5 inch cassette case, the disc diameter is approximately 86 mm, providing a data storage area with a radius of 25 mm to 41 mm. It is assumed that a 670 nm wavelength laser is used with a 0.55NA objective lens. With a 0.8 m track pitch (1.6 µm V-groove pitch) and 0.474 µm bit length, the unformatted single-side capacity is 1.1 Gbytes. Using the standard CD format, a single-side formatted capacity of 550 Mb, the same as a 12 µcm CD, can be obtained.

If information conventionally provided as printed material is to be provided in the future on a CD-ROM or other optical data medium, it will also be necessary and convenient if the user is able to write to the medium to record notes as is done currently with paper media, instead of only being able to read the information. One method which makes this possible divides the disc into a read/writable areas, wherein a recording film is formed on the inside portion of the disc, and a read-only data area comprising a reflective metal film on the outside portion of the disc. However, this method reduces the read-only data area, and therefore limits the amount of information distributable on a single disc.

As thus described, while smaller, higher capacity optical data media, including optical discs and cards, are desirable. A double-sided optical disc having the recording layers on both sides thereof and an optical disc having a plurality of information storage layers have been developed to improve the density of information stored per unit area of the disc.

For example, U.S. Pat. No. 4,839,881 (Jun. 13, 1989) issued by Takahara et al. proposes an optical double-sided disc having the recording layers on both sides thereof and a pickup transport device for use in an optical disc apparatus having a U-shaped guide assembly for recording and/or reproducing information of the disc by guiding a pickup along upper and lower surfaces of the double-sided disc by the U-shaped guide assembly.

However, the pickup transport device having the U-shaped guide assembly is complicated in construction, thereby the miniaturization of the products is difficult and the cost of products is increased.

Also, Laid-open Publication NO. 61-107552 (published on May 26, 1986) of Japanese Patent Application NO. 59-228743 proposes a magneto-optical disc which has a plurality of magneto-optical storage layers. According to the magneto-optical disc, information may be written on and read from the individual magneto-optical storage layers, whereby the density of information recordable per unit area of the disc is drastically increased.

However, a conventional optical disc having two or more storage layers as indicated above requires corresponding light sources for emitting laser beams having different wavelengths for reading recorded information from the respective storage layers, respectively. Further, this conventional system requires two or more sets of detectors adapted to the different wavelengths of the laser beams reflected by the respective storage lasers, so that the information can be read based on a change in the Kerr rotation angles of the reflected beams having the different wavelengths. Hence, the conventional information reading or reproducing system tends to be complicated in construction and expensive.

SUMMARY OF THE INVENTION

It is an object of the present invention to provide an optical disc with a plurality of recording layers capable of recording/reproducing information on/from the disc with a high density by using an optical recording/reproducing device of a simple construction.

In order to achieve the above-mentioned object, an optical disc with a plurality of recording layers according to the present invention, wherein recording/reproducing information on/from the disc is carried out by a laser beam of a predetermined wavelength irradiated from an optical pickup device, comprises a protective layer;

a first recording layer having a desired pattern, the first recording layer being formed under the protective layer;

a coating layer by which one part of the laser beam is reflected with a predetermined reflectance and through which the other part is transmitted;

a dielectric layer;

a second recording layer having a desired pattern, the second recording layer being formed under the dielectric layer; and a reflective layer by which the laser beam is totally reflected, according to that order from the top when the laser beam is incident on the disc, whereby a plurality of recording layers are recorded/reproduced depending upon a difference of light amounts of the laser beams reflected to the optical pickup device.

Furthermore, the optical disc with a plurality of recording layers repeatedly comprises, between the second recording layer and the reflective layer, a coating layer by which one part of the laser beam is reflected with a predetermined reflectance and through which the other part is transmitted;

a dielectric layer; and a recording layer having a desired pattern, the first recording layer being formed under the dielectric layer, according to that order from the top when the laser beam is incident on the disc.

Also, in order to achieve the above-mentioned object, an optical disc with a plurality of recording layers according to the present invention, wherein recording/reproducing information on/from the disc is carried out by first and second laser beams of different wavelengths irradiated from an optical pickup device, comprises

- a protective layer;
- a first recording layer having a desired pattern, the first recording layer being formed under the protective layer;
- a first coating layer by which one part of the first laser beam is reflected with a predetermined reflectance and through which the other part is transmitted, and through which the second laser beam is totally transmitted;
- a first dielectric layer;
- a second recording layer having a desired pattern, the second recording layer being formed under the first dielectric layer;
- a second coating layer by which one part of the second laser beam is reflected with a predetermined reflectance and through which the other part is transmitted, and through which the first laser beam is totally transmitted;
- a second dielectric layer;
- a third recording layer having a desired pattern, the third recording layer being formed under the second dielectric layer;
- a first reflective layer which the first laser beam is totally reflected by and the second laser beam is totally transmitted through;
- a third dielectric layer;
- a fourth recording layer having a desired pattern, the fourth recording layer being formed under the third dielectric layer; and
- a second reflective layer by which the second laser beam is totally reflected, according to that order from the top when the first or second laser beam is incident on the disc, whereby a plurality of recording layers are recorded/reproduced depending upon a difference of light amounts of the laser beams reflected to the optical pickup device.

Furthermore, the optical disc with a plurality of recording layers repeatedly comprises,

- between the third recording layer and the first reflective layer,
- a coating layer by which one part of the first laser beam is reflected with a predetermined reflectance and through which the other part is transmitted, and through which the second laser beam is totally transmitted;
- a dielectric layer;
- a recording layer having a desired pattern;
- a coating layer by which one part of the second laser beam is reflected with a predetermined reflectance and through which the other part is transmitted, and through which the first laser beam is totally transmitted;
- another dielectric layer; and
- another recording layer having a desired pattern, according to that order from the top when the first or second laser beam is incident on the disc.

As described above, the optical disc with a plurality of recording layers according to the present invention is provided with a coating layer having a predetermined reflectance between two recording layers, thereby the light amount of the laser beam reflected from the coating layer for reading information of the upper recording layer becomes larger than the light amount of the laser beam transmitted through the coating layer for reading information of the lower recording layer. Since the difference between the light amounts of the two recording layers generates the change of amplitude of RF signals detected at photodetector of the optical pickup device, it is possible to separately record and/or reproduce the respective recording layers of the optical disc with a plurality of recording layers depending upon amplitudes of the RF signals.

Since recording/reproducing the respective recording layers is carried out by a single laser source having a single wavelength, being carried out on the ground that the light amounts corresponding to the respective recording layers are different, distances between the respective recording layers can be properly determined as the producer wishes when producing disc, and the focusing servo is achieved by only moving the objective lens in focusing direction, and therefore to produce disc is not difficult.

Thus, with the optical disc according to the present invention, it is possible to record/reproduce information in the state that the conventional simple optical recording/reproducing device is still used, and also it is possible to record/reproduce information with a high density.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

An optical pickup device according to the present invention will be described in detail below.

Embodiment 1

Figure 1:
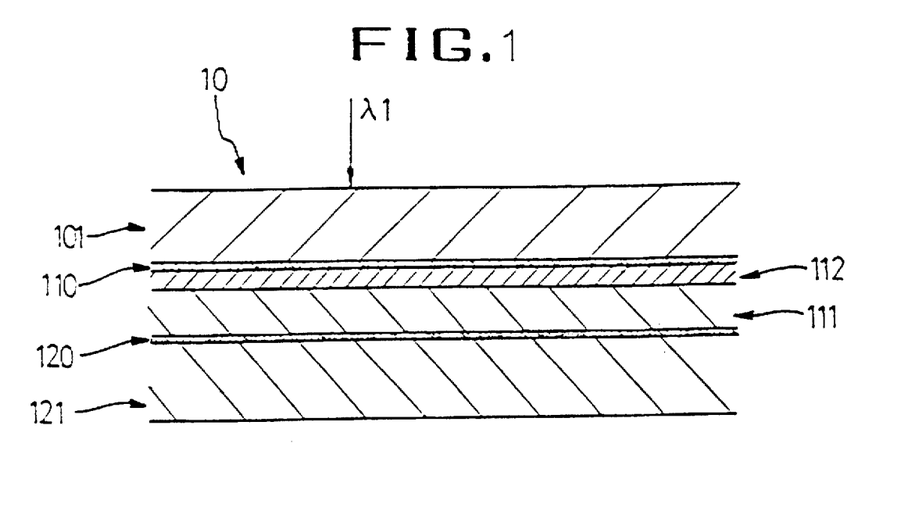
FIG. 1 is a schematic cross-sectional view for showing an optical disc with a plurality of recording layers according to the first embodiment of the present invention.

FIG. 1 is a schematic cross-sectional view for showing an optical disc with a plurality of recording layers according to the first embodiment of the present invention.

An optical disc 10 according to the first embodiment of the present invention, as shown in FIG. 1, from the top of disc 10, has a protective layer 101 and a first recording layer 110 having a predetermined pattern and formed under protective layer 101. And under first recording layer 110 is formed a coating layer 112 by which one half of the laser beam having a predetermined wavelength (for example, 780–860 nm) is reflected with reflectance 0.5 and through which the other half is transmitted. A dielectric layer 111 and a second recording layer 120 having a predetermined pattern and formed under dielectric layer 111 are formed under coating layer 112 according to that order. And under second recording layer 120, a reflective layer 121 is laminated by which the laser beam is totally reflected.

Meanwhile, the distance between first recording layer 110 and second recording layer 120 can be arbitrarily determined as the producer wishes when producing disc, and reproducing the respective recording layers can be achieved by moving the objective lens in focusing direction depending upon the distance. Informations of first recording layer 110 and second recording layer 120 are separated by the light amounts of the laser beams reflected from the disc.

Hereinbelow, the operation of the optical disc according to the present embodiment constructed as above will be described.

An optical pickup device (not shown) for recording and/or reproducing the disc is provided over optical disc 10 shown in FIG. 1. The laser beam having a predetermined wavelength $\lambda 1$ (generally 780–860 nm) is irradiated toward the top of disc 10 from a laser diode in the optical pickup device.

The laser beam is transmitted through protective layer 101 and a first recording layer 110. Subsequently, while the laser beam is passing through coating layer 112 of reflectance 0.5, one half of the laser beam is transmitted therethrough and the other half is reflected therefrom.

The reflected half of the laser beam is returned to the optical pickup device, and the optical pickup device detects and reproduces RF signals (digital signals from 3T to 11T) as data, tracking, and focusing signals from this laser beam. The signal detected at the photodetector in the optical pickup device is normally reproduced in the state of the voltage of $1V \pm 0.2V$ through the RF amplifier.

Meanwhile, the transmitted half of the laser beam is continuously transmitted through dielectric layer 111 and a second recording layer 120, being reflected from reflective layer 121 under second recording layer 120. After being transmitted backwards through second recording layer 120 and dielectric layer 111, the reflected laser beam is incident on coating layer 112, and then one half of the beam is transmitted therethrough and the other half of the beam is reflected therefrom.

Therefore, $\frac{1}{2} * \frac{1}{2}$, i.e., $\frac{1}{4}$, of the originally irradiated laser beam is returned to the optical pickup device, and if RF signal of 1V was generated when reproducing signals of the upper layer, i.e., first recording layer 110, then the voltage of the output signal will be dropped to $\frac{1}{2}$ when reproducing signals of the lower layer, i.e., second recording layer 120.

Thus, it is possible to record/reproduce information of the first recording layer or the second recording layer depending upon the amplitude of RF signals.

Embodiment 2

Figure 2:
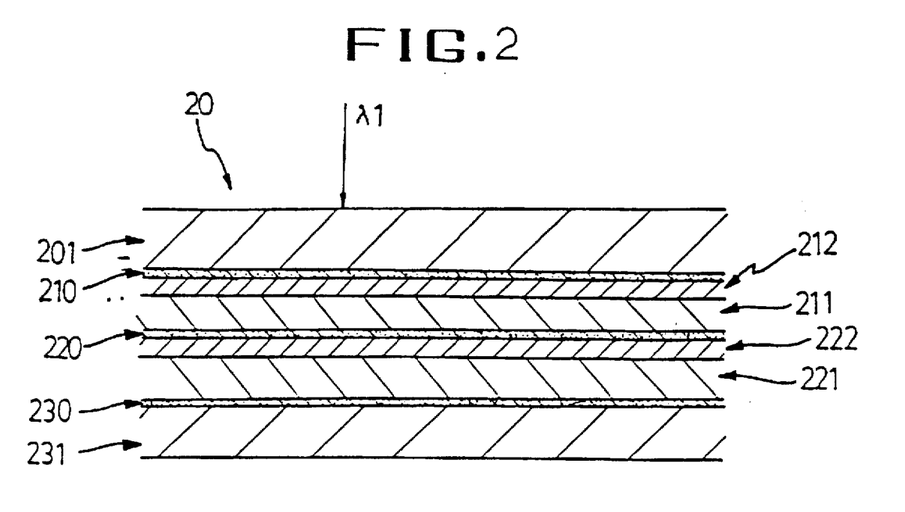
FIG. 2 is a schematic cross-sectional view for showing an optical disc with a plurality of recording layers according to the second embodiment of the present invention.

FIG. 2 is a schematic cross-sectional view for showing an optical disc with a plurality of recording layers according to the second embodiment of the present invention.

An optical disc 20 according to the second embodiment of the present invention, as shown in FIG. 2, from the top of disc 20, has a protective layer 201 and a first recording layer 210 having a predetermined pattern and formed under protective layer 201. And under first recording layer 210 is formed a first coating layer 212 by which one half of the laser beam having a predetermined wavelength (for example, 780–860 nm) is reflected, for example, with reflectance 0.5 and through which the other half is transmitted. A first dielectric layer 211 and a second recording layer 220 having a predetermined pattern and formed under first dielectric layer 211 are formed under first coating layer 212 according to that order. Under second recording layer 210 is formed a second coating layer 222 by which one half of the laser beam is reflected, for example, with reflectance 0.5 and through which the other half is transmitted. A second dielectric layer 221 and a second recording layer 220 having a predetermined pattern and formed under second dielectric layer 221 are formed under second coating layer 222 according to that order. And under third recording layer 230, a reflective layer 231 is laminated by which the laser beam is totally reflected.

Meanwhile, the respective distances between first, second, and third recording layers 210, 220 and 230 can be arbitrarily determined as the producer wishes when producing disc, and reproducing the respective recording layers can be achieved by moving the objective lens in focusing direction depending upon the distances. Informations of first, second, and third recording layers 210, 220, and 230 are separated by the light amounts of the laser beams reflected from the disc.

Hereinbelow, the operation of the optical disc according to the present embodiment constructed as above will be described.

An optical pickup device (not shown) for recording and/or reproducing the disc is provided over optical disc 20 shown in FIG. 2. The laser beam having a predetermined wavelength $\lambda 1$ (generally 780–860 nm) is irradiated toward the top of disc 20 from a laser diode in the optical pickup device.

The laser beam is transmitted through protective layer 201 and a first recording layer 210. Subsequently, while the laser beam is passing through coating layer 212 of reflectance 0.5, one half of the laser beam is transmitted therethrough and the other half is reflected therefrom.

The half of the laser beam reflected from first coating layer 212 is returned to the optical pickup device, and as in first embodiment, the optical pickup device detects and reproduces RF signals (digital signals from 3T to 11T) as data, tracking, and focusing signals of first recording layer 210 from this laser beam.

Meanwhile, the half of the laser beam transmitted through first coating layer 212 is continuously transmitted through dielectric layer 211 and a second recording layer 220. Subsequently, while the laser beam is passing through second coating layer 222 of reflectance 0.5, one half of the laser beam is transmitted therethrough and the other half is reflected therefrom.

Thus, $\frac{1}{2} * \frac{1}{2}$, i.e., $\frac{1}{4}$, of the originally irradiated laser beam is returned to the optical pickup device. Therefore, if RF signal of 1V was generated when reproducing signals of the uppermost layer, i.e., first recording layer 210, then the voltage of the output signal will be dropped to about $\frac{1}{2}$ when reproducing signals of the lowermost layer, i.e., second recording layer 220.

On the other hand, the half of the laser beam transmitted through second coating layer 222, that is, $\frac{1}{4}$ of the originally irradiated laser beam is continuously transmitted through second dielectric layer 221 and a third recording layer 230. Subsequently, the transmitted laser beam is totally reflected by total reflective layer 231 under third recording layer 230. This reflective beam is transmitted backwards through third recording layer 230 and second dielectric layer 221. Subsequently, while the laser beam is passing through second coating layer 222 of reflectance 0.5, only one half of the laser beam is transmitted therethrough. That is, only $\frac{1}{8}(=\frac{1}{4}*\frac{1}{2})$ of the originally irradiated laser beam is transmitted. After the $\frac{1}{8}$ of laser beam is continuously transmitted through second recording layer 220 and first dielectric layer 211, the laser beam passes through first coating layer 222 of reflectance 0.5, and only one half of the laser beam is transmitted therethrough. That is, only ⅛(=¼*½) of the originally irradiated laser beam is transmitted to be returned to the optical pickup device. Therefore, if RF amplifier is so controlled that RF signal of 1V can be generated when reproducing signals of the uppermost layer, i.e., first recording layer 210, then the voltage of the output signal will be dropped to about ⅛V when reproducing signals of the lowermost layer, i.e., third recording layer 230.

Thus, it is possible to record/reproduce information of the first recording layer, the second recording layer, or the third recording layer depending upon the respective amplitudes of RF signals.

Embodiment 3

Figure 3:
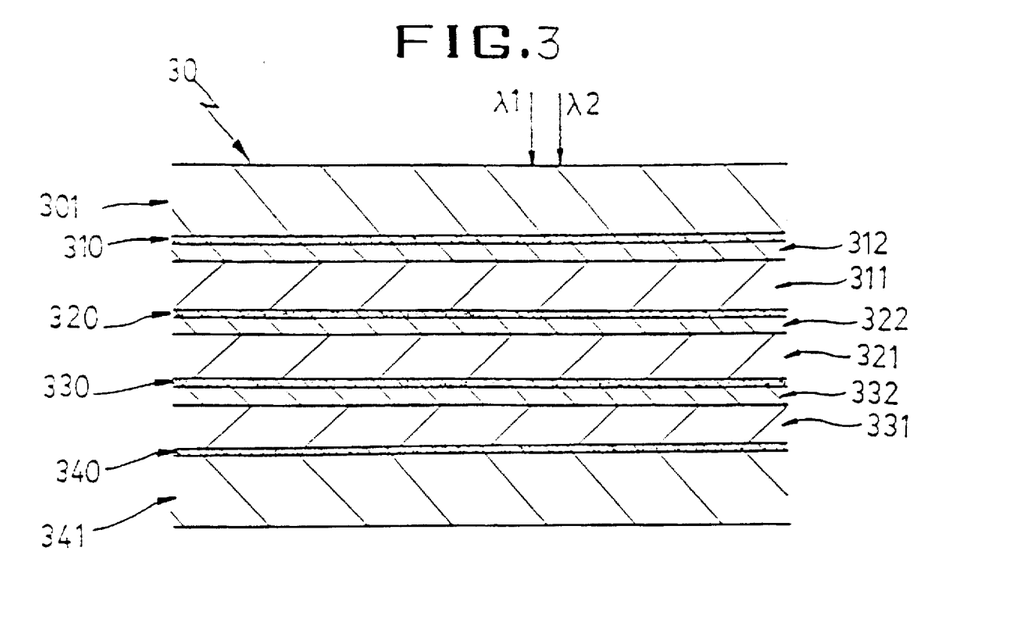
FIG. 3 is a schematic cross-sectional view for showing an optical disc with a plurality of recording layers according to the third embodiment of the present invention.

FIG. 3 is a schematic cross-sectional view for showing an optical disc with a plurality of recording layers according to the third embodiment of the present invention.

An optical disc 30 according to the third embodiment of the present invention, as shown in FIG. 3, from the top of disc 30, has a protective layer 301 and a first recording layer 310 having a predetermined pattern and formed under protective layer 301. And under first recording layer 310 is formed a first coating layer 312 by which one half of the first laser beam λ1 having a predetermined wavelength (for example, 780–860 nm) is reflected, for example, with reflectance 0.5 and through which the other half is transmitted, and through which the second laser beam λ2 is totally transmitted. A first dielectric layer 311 and a second recording layer 320 having a predetermined pattern and formed under first dielectric layer 311 are formed under first coating layer 312 according to that order. Under second recording layer 320 is formed a second coating layer 322 by which one half of the second laser beam λ2 is reflected, for example, with reflectance 0.5 and through which the other half is transmitted, and through which the first laser beam µ1 is totally transmitted. A second dielectric layer 321 and a third recording layer 330 having a predetermined pattern and formed under second dielectric layer 321 are formed according to that order under second coating layer 322. And under third recording layer 330, a first reflective layer 332 is laminated by which the first laser beam λ1 is totally reflected and through which the second laser beam λ2 is totally transmitted. A third dielectric layer 331 and a fourth recording layer 340 having a predetermined pattern and formed under third dielectric layer 321 are formed according to that order under first reflective layer 322. Under fourth recording layer 340, a second reflective layer 341 is laminated by which the second laser beam λ2 is totally reflected.

The distance between first recording layer 310 and second recording layer 320 is so determined that the first and second laser beams can be respectively focused at the first recording layer 310 and the second recording layer 320 via the objective lens of the optical pickup according to respective focusing distances in which the respective focusing distance $(1/f=(n_1-1)(1/R_1-1/R_2)$ are different depending upon wavelengths due to axial chromatic aberration phenomenon. The distance between third recording layer 330 and fourth recording layer 340 is also determined by axial chromatic aberration phenomenon.

Meanwhile, the distance between first recording layer 310 and third recording layer 330 can be arbitrarily determined as the producer wishes when producing disc, and reproducing the respective recording layers can be achieved by moving the objective lens in focusing direction depending upon the distances. Informations of first and second recording layers 310 and 320 are separated by the light amounts of the laser beams reflected from the disc. The distance between second recording layer 320 and fourth recording layer 340 can be so determined as the distance between first recording layer 310 and third recording layer 330.

Hereinbelow, the operation of the optical disc according to the present embodiment constructed as above will be described.

As in FIG. 1, an optical pickup device (not shown) for recording and/or reproducing the disc is provided over optical disc 30 shown in FIG. 3. The optical pickup device has first and second laser diodes generating predetermined different wavelengths λ1 and λ2.

When the first laser beam having a predetermined wavelength λ1 (generally 780–860 nm) is irradiated toward the top of disc 30, the first laser beam is transmitted through protective layer 301 and a first recording layer 310. Subsequently, while the first laser beam is passing through first coating layer 312 (which has the reflectance of 0.5 with the first laser beam λ1 and which is totally transmitted with the second laser beam λ2), one half of the first laser beam is reflected therefrom and the other half of the first laser beam is transmitted therethrough.

The half of the first laser beam reflected from first coating layer 312 is returned to the optical pickup device, and as in first embodiment, the optical pickup device detects and reproduces RF signals (digital signals from 3T to 11T) as data, tracking, and focusing signals of first recording layer 310 from this laser beam.

Meanwhile, the half of the first laser beam transmitted through first coating layer 312 is continuously transmitted through a first dielectric layer 311 and a second recording layer 320. Subsequently, while passing through second coating layer 322 (which is totally transmitted with the first laser beam λ1 and which has the reflectance of 0.5 with the second laser beam λ2) under second recording layer 320, the first laser beam is transmitted therethrough. Thereafter, the first laser beam is continuously transmitted through a second dielectric layer 321 and a third recording layer 330 thereunder. Subsequently, while passing through first reflective layer 332 (which is totally reflected with the first laser beam λ1 and which is totally transmitted with the second laser beam λ2) under third recording layer 330, the first laser beam is totally reflected. This totally reflected first laser beam is transmitted backwards through third recording layer 330, second dielectric layer 321, second coating layer 322, a second recording layer 320, and first dielectric layer 311 according to that order. While the transmitted first laser beam is passing through first coating layer 312, only one half of the beam is transmitted therethrough. That is, only ¼ of the originally irradiated laser beam is returned to the optical pickup device. Thus, if RF amplifier was so controlled that RF signal of 1V was generated when reproducing signals of the upper layer, i.e., first recording layer 310, then the voltage of the output signal will be dropped to about ½ when reproducing signals of the lower layer, i.e., third recording layer 330.

On the other hand, when the second laser beam having another predetermined wavelength λ2 (generally 780–860 nm) is irradiated toward the top of disc 30, the second laser beam is transmitted through protective layer 301, and first recording layer 310, first coating layer 312 (which has the reflectance of 0.5 with the first laser beam λ1 and which is totally transmitted with the second laser beam λ2), first dielectric layer 311, and a second recording layer 320 according to that order. Thereafter, while the second laser beam is passing through second coating layer 322 (which has the reflectance of 0.5 with the second laser beam λ2 and which is totally transmitted with the first laser beam λ1), one half of the second laser beam is reflected therefrom and the other half of the second laser beam is transmitted therethrough.

The half of the second laser beam reflected from second coating layer 322 is returned to the optical pickup device, and the optical pickup device detects and reproduces RF signals (digital signals from 3T to 11T) as data, tracking, and focusing signals of second recording layer 320 from this second laser beam.

Meanwhile, the half of the second laser beam transmitted through second coating layer 322 is continuously transmitted through a second dielectric layer 321 and a third recording layer 330, first reflective layer 332 (which is totally reflected with the first laser beam λ1 and which is totally transmitted with the second laser beam λ2), third dielectric layer 331, and fourth recording layer 340 according to that order. After being totally reflected from second reflective layer 341 (which totally reflects the second laser beam λ1), the transmitted second laser beam is transmitted through recording layer 340, third dielectric layer 331, first reflective layer 332, third recording layer 330, and second dielectric layer 321 according to that order. While the second laser beam is passing through second coating layer 322 (which has the reflectance of 0.5 with the second laser beam λ2 and which is totally transmitted with the first laser beam λ1), only one half of the second laser beam is transmitted therethrough. That is, only ¼ of the originally irradiated laser beam is returned to the optical pickup device.

Thus, if RF amplifier was so controlled that RF signal of 1V was generated when reproducing signals of the upper layer, i.e., second recording layer 320 by the second laser beam, then the voltage of the output signal will be dropped to about ½ when reproducing signals of the lower layer, i.e., fourth recording layer 340.

Thus, it is possible to record/reproduce information from the first recording layer to the second recording layer depending upon the respective amplitudes of RF signals detected at the photodetector of the optical pickup device.

Embodiment 4

Figure 4:
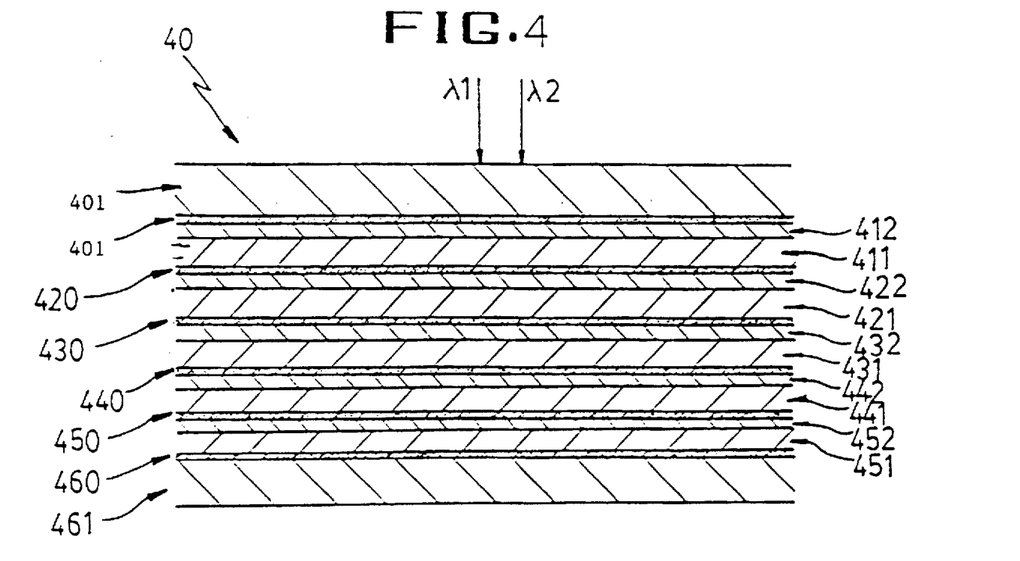
FIG. 4 is a schematic cross-sectional view for showing an optical disc with a plurality of recording layers according to the fourth embodiment of the present invention.

FIG. 4 is a schematic cross-sectional view for showing an optical disc with a plurality of recording layers according to the fourth embodiment of the present invention.

An optical disc 40 according to the fourth embodiment of the present invention, as shown in FIG. 4, from the top of disc 40, has a protective layer 401 and a first recording layer 410 having a predetermined pattern and formed under protective layer 401. And under first recording layer 410 is formed a first coating layer 412 by which one half of the first laser beam λ1 having a predetermined wavelength (for example, 780–860 nm) is reflected, for example, with reflectance 0.5 and through which the other half is transmitted, and through which the second laser beam λ2 having another predetermined wavelength (for example, 780–860 nm) is totally transmitted. A first dielectric layer 411 and a second recording layer 420 having a predetermined pattern and formed under first dielectric layer 411 are formed under first coating layer 412 according to that order. Under second recording layer 420 is formed a second coating layer 422 by which one half of the second laser beam λ2 is reflected, for example, with reflectance 0.5 and through which the other half is transmitted, and through which the first laser beam λ1 is totally transmitted. A second dielectric layer 421 and a third recording layer 430 having a predetermined pattern and formed under second dielectric layer 421 are formed according to that order under second coating layer 422. And under third recording layer 430, is formed a third coating layer 432 by which one half of the first laser beam λ1 is reflected, for example, with reflectance 0.5 and through which the other half is transmitted, and through which the second laser beam λ2 is totally transmitted. A third dielectric layer 431 and a fourth recording layer 440 having a predetermined pattern and formed under third dielectric layer 431 are formed under third coating layer 432 according to that order. Under fourth recording layer 440 is formed a fourth coating layer 442 by which one half of the second laser beam λ2 is reflected, for example, with reflectance 0.5 and through which the other half of the second laser beam λ2 is transmitted, and through which the first laser beam λ1 is totally transmitted. A fourth dielectric layer 441 and a fifth recording layer 450 having a predetermined pattern and formed under fourth dielectric layer 441 are formed according to that order under fourth coating layer 442. Under fifth recording layer 450 is formed a first reflective layer 452 which the first laser beam λ1 is totally reflected by and the second laser beam λ2 is totally transmitted through. A fifth dielectric layer 451 and a sixth recording layer 460 having a predetermined pattern and formed under fifth dielectric layer 451 are formed according to that order under first reflective layer 452. Under sixth recording layer 460, a second reflective layer 461 is formed by which the second laser beam λ2 is totally reflected.

The distance between first recording layer 410 and second recording layer 420 is so determined that the first and second laser beams can be respectively focused at the first recording layer 410 and the second recording layer 420 via the objective lens of the optical pickup according to respective focusing distances in which the respective focusing distances $(1/f=(n_1-1)(1/R_1-1/R_2)$ are different due to axial chromatic aberration phenomenon. The distances between third, fourth, fifth, and sixth recording layers 430, 440, 450, and 460 are also determined by axial chromatic aberration phenomenon.

Meanwhile, the distances between first recording layer 410, third recording layer 430, and fifth recording layer 450 can be arbitrarily determined as the producer wishes when producing disc, and reproducing the respective recording layers can be achieved by moving the objective lens in focusing direction depending upon the distances. Informations of first, third, and fifth recording layers 410, 430 and 450 are separated by the light amounts of the laser beams reflected from the disc. The distances between second recording layer 420, fourth recording layer 440, and sixth recording layer 460 can be so determined as the distances between first recording layer 410, third recording layer 430, and fifth recording layer 450.

Hereinbelow, the operation of the optical disc according to the present embodiment constructed as above will be described.

As in FIG. 1, an optical pickup device (not shown) for recording and/or reproducing the disc is provided over optical disc 40 shown in FIG. 4. The optical pickup device has first and second laser diodes generating predetermined different wavelengths λ1 and λ2.

When the first laser beam having a predetermined wavelength λ1 (generally 780–860 nm) is irradiated toward the top of disc 40, the first laser beam is transmitted through protective layer 401 and a first recording layer 410. Subsequently, while the first laser beam is passing through first coating layer 412 (which has the reflectance of 0.5 with the first laser beam λ1), one half of the first laser beam is reflected therefrom and the other half of the first laser beam is transmitted therethrough.

The half of the first laser beam reflected from first coating layer 412 is returned to the optical pickup device, and as in first embodiment, the optical pickup device detects and reproduces RF signals (digital signals from 3T to 1T) as data, tracking, and focusing signals of first recording layer 410 from this laser beam.

Meanwhile, the half of the first laser beam transmitted through first coating layer 412 is continuously transmitted through a first dielectric layer 411 and a second recording layer 420. Subsequently, while passing through second coating layer 422 (which is totally transmitted with the first laser beam λ1 and which has the reflectance of 0.5 with the second laser beam λ2) under second recording layer 420, the first laser beam is transmitted therethrough. Thereafter, the first laser beam is continuously transmitted through a second dielectric layer 421 and a third recording layer 430 thereunder.

Subsequently, while the transmitted half of the first laser beam is passing through third coating layer 432 (which has the reflectance of 0.5 with the first laser beam λ1 and which is totally transmitted with the second laser beam λ2), one half of the beam is reflected therefrom and the other half of the beam is transmitted therethrough.

The first laser beam reflected from third coating layer 432, that is, ¼ of the originally irradiated first laser beam is transmitted backwards through third recording layer 430, second dielectric layer 421, second coating layer 422, second recording layer 420, and first dielectric layer 411 according to that order. Thereafter, while passing through first coating layer 412, only one half of this beam is transmitted therethrough to be returned to the optical pickup device. That is, only ⅛(=¼*½) of the originally irradiated first laser beam is returned to the optical pickup device. The optical pickup device detects and reproduces RF signals (digital signals from 3T to 11T) as data, tracking, and focusing signals of third recording layer 430 from this laser beam.

On the other hand, the laser beam transmitted through third coating layer 432, that is, ¼ of the originally irradiated laser beam is continuously transmitted through third dielectric layer 431 and a fourth recording layer 440, fourth coating layer 442 (which the first laser beam is totally transmitted through), a fourth dielectric layer 441 and a fifth recording layer 450. Subsequently, the laser beam is totally reflected by first reflective layer 451 under fifth recording layer 450. This totally reflected first laser beam is returned to pass through third coating layer 432, only one half of this beam is transmitted therethrough. Successively, this transmitted beam passes through third coating layer 432, and only one half of this beam is transmitted therethrough to be returned to the optical pickup device. That is, only ¹⁄₁₆(= ¼*½*½) of the originally irradiated first laser beam is returned to the optical pickup device.

Thus, if RF amplifier is so controlled that RF signal of 1V can be generated when reproducing signals of the uppermost layer, i.e., first recording layer 410 by the first laser beam, then the voltage of the output signal will be dropped to about ⅛v when reproducing signals of the lowermost layer, i.e., fifth recording layer 450.

On the other hand, when the second laser beam having another predetermined wavelength λ2 (generally 780–860 nm) is irradiated toward the top of disc 40, the second laser beam is transmitted through protective layer 401, first recording layer 410, first coating layer 412 (which has the reflectance of 0.5 with the first laser beam λ1 and which is totally transmitted with the second laser beam λ2), first dielectric layer 411, and second recording layer 420. Subsequently, while the transmitted second laser beam is passing through second coating layer 422 (which has the reflectance of 0.5 with the second laser beam λ2 and which is totally transmitted with the first laser beam λ1), one half of the second laser beam is reflected therefrom and the other half of the second laser beam is transmitted therethrough.

The half of the second laser beam reflected from second coating layer 422 is returned to the optical pickup device, and the optical pickup device detects and reproduces RF signals (digital signals from 3T to 11T) as data, tracking, and focusing signals of second recording layer 420 from this second laser beam.

Meanwhile, the half of the second laser beam transmitted through second coating layer 422 is continuously transmitted through second dielectric layer 421 and third recording layer 430. Subsequently, while passing through third coating layer 432 (which is totally transmitted with the second laser beam λ2 and which has the reflectance of 0.5 with the first laser beam λ1) under third recording layer 430, the second laser beam is transmitted therethrough. Thereafter, the second laser beam is continuously transmitted through third dielectric layer 431 and fourth recording layer 440 thereunder. Subsequently, while the transmitted half of the second laser beam is passing through fourth coating layer 442 (which has the reflectance of 0.5 with the second laser beam λ2 and which is totally transmitted with the second laser beam λ1) under fourth recording layer 440, one half of the beam is reflected therefrom and the other half of the beam is transmitted therethrough.

The second laser beam reflected from fourth coating layer 442, that is, ¼ of the originally irradiated second laser beam is transmitted backwards through second coating layer 422, and only one half of this beam is transmitted therethrough to be returned to the optical pickup device. That is, only ⅛(=¼*½) of the originally irradiated second laser beam is returned to the optical pickup device. The optical pickup device detects and reproduces RF signals (digital signals from 3T to 11T) as data, tracking, and focusing signals of fourth recording layer 440 from this laser beam.

On the other hand, the laser beam transmitted through fourth coating layer 442, that is, ¼ of the originally irradiated laser beam is continuously transmitted through fourth dielectric layer 441, fifth recording layer 450, first reflective layer 452 (which the first laser beam is totally reflected from and the second laser beam is totally transmitted through) according to that order, fifth dielectric layer 451 and sixth recording layer 460. Subsequently, the laser beam is totally reflected by second reflective layer 461. This totally reflected second laser beam is returned to pass through fourth coating layer 442, only one half of this beam is transmitted therethrough. Successively, this transmitted beam passes through second coating layer 422, and only one half of this beam is transmitted therethrough to be returned to the optical pickup device. That is, only ¹⁄₁₆(=¼*½*½) of the originally irradiated second laser beam is returned to the optical pickup device.

Thus, if RF amplifier is so controlled that RF signal of 1V can be generated when reproducing signals of the upper layer, i.e., second recording layer 420 by the second laser beam, then the voltage of the output signal will be dropped to about ⅛v when reproducing signals of the lowermost layer, i.e., sixth recording layer 460.

Thus, it is possible to record/reproduce information of the second, fourth, and sixth recording layers depending upon the respective amplitudes of RF signals detected at the photodetector of the optical pickup device.

As described above, the optical disc with a plurality of recording layers according to the present invention is provided with a coating layer having a predetermined reflectance between two recording layers, thereby the light amount of the laser beam reflected from the coating layer for reading information of the upper recording layer becomes larger than the light amount of the laser beam transmitted through the coating layer for reading information of the lower recording layer. Since the difference between the light amounts of the two recording layers generates the change of amplitude of RF signals detected at photodetector of the optical pickup device, it is possible to separately record and/or reproduce the respective recording layers of the optical disc with a plurality of recording layers depending upon amplitudes of the RF signals.

Since recording/reproducing the respective recording layers is carried out by a single laser source having a single wavelength, being carried out on the ground that the light amounts corresponding to the respective recording layers are different, distances between the respective recording layers can be properly determined as the producer wishes when producing disc, and the focusing servo is achieved by only moving the objective lens in focusing direction, and therefore to produce disc is not difficult.

Thus, with the optical disc according to the present invention, it is possible to record/reproduce information in the state that the conventional simple optical recording/ reproducing device is still used, and also it is possible to record/reproduce information with a high density.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. An optical disc with a plurality of recording layers wherein recording/reproducing information on/from the disc is carried out by a laser beam of a predetermined wavelength irradiated from an optical pickup device, the optical disc comprising:

a protective layer formed at a top part of the optical disc, the laser beam being transmitted through said protective layer;

a first recording layer having a first pattern, the first recording layer being formed under said protective layer;

a first coating layer having a first reflectance formed under said first recording layer, one part of said laser beam transmitted through said protective layer and said first recording layer being partially reflected by the first reflectance of said first coating layer and another part of said laser beam being partially transmitted through said first coating layer;

a second recording layer having a second pattern, the second recording layer being formed under said first coating layer; and a total reflective layer formed under said second recording layer, the laser beam part transmitted through said second recording layer being substantially totally reflected by said reflective layer, whereby first and second recording layers are recorded/ reproduced depending upon a difference of light amounts of said laser beam parts returned to said optical pickup device from the optical disc.

2. The optical disc of claim 1, further comprising one or more repeating parts between said second recording layer and said reflective layer, wherein each repeating part comprises:

a second coating layer formed under said second recording layer and having a second reflectance, one part of said laser beam being partially reflected by the second reflectance of said second coating layer and the other part of said laser beam being partially transmitted through said second coating layer; and a third recording layer having a third pattern, said third recording layer being formed under said second coating layer.

3. The optical disc of claim 2, wherein the first and the second reflectances are 0.5.

4. The optical disc of claim 1, wherein the first reflectance is 0.5.

5. The optical disc of claim 1, further comprising a first dielectric layer formed under said first coating layer for protecting said first recording layer, the beam parts being transmitted through said first dielectric layer.

6. An optical disc with a plurality of recording layers wherein recording/reproducing information on/from the disc is carried out by first and second laser beams of different wavelengths irradiated from an optical pickup device, the optical disc comprising:

a protective layer which is formed at a top part of the optical disc, the first and second laser beams being transmitted through said protective layer;

a first recording layer having a first pattern, the first recording layer being formed under said protective layer;

a first coating layer having a first reflectance formed under said first recording layer, one part of said first laser beam transmitted through said protective layer and said first recording layer being partially reflected by the first reflectance of said first coating layer and another part of said first laser beam being partially transmitted through said first coating layer, and said second laser beam transmitted through said protective layer and said first recording layer being substantially totally transmitted through the first coating layer;

a second recording layer having a second pattern, the second recording layer being formed under said first coating layer;

a second coating layer having a second reflectance formed under said first recording layer, one part of said second laser beam being partially reflected by the second reflectance of said second coating layer and another part of said second laser beam being partially transmitted through said second coating layer, and said first laser beam being substantially totally transmitted through the second coating layer;

a third recording layer having a third pattern, the third recording layer being formed under said second coating layer;

a first reflective layer formed under said third recording layer, said first laser beam being substantially totally reflected by said first reflective layer and said second laser beam being substantially totally transmitted through said first reflective layer;

a fourth recording layer having a fourth pattern, the fourth recording layer being formed under said first reflective layer; and a second reflective layer formed under said fourth recording layer, said second laser beam being substantially totally reflected by said second reflective layer, whereby the recording layers are recorded/reproduced depending upon a difference of light amounts of the first laser beam parts returned to said optical pickup device from the optical disc and a difference of light amounts of the second laser beam parts returned to said optical pickup device from the optical disc.

7. The optical disc of claim 6, further comprising one or more repeating parts between said third recording layer and said first reflective layer, wherein each repeating part comprises:

- a third coating layer formed under said third recording layer and having a third reflectance, one part of said first laser beam being partially reflected by the third reflectance of said third coating layer and another part of said first laser beam being partially transmitted through said third coating layer, and said second laser beam being substantially totally transmitted through said third coating layer;
- a fifth recording layer having a fifth pattern, the fifth recording layer being formed under said third coating layer;
- a fourth coating layer having a fourth reflectance which is formed under said fifth recording layer, one part of said second laser beam being partially reflected by the fourth reflectance of said fourth coating layer and another part of said second laser beam being partially transmitted through said fourth coating layer, and said first laser beam being substantially totally transmitted through said fourth coating layer;
- a sixth recording layer having a sixth pattern, the sixth recording layer being formed under said fourth coating layer.

8. The optical disc of claim 7, wherein the first, the second, the third and the fourth reflectances are 0.5.

9. The optical disc of claim 6, wherein the first and the second reflectances are 0.5.

10. The optical disc of claim 6, further comprising a first dielectric layer formed under said first coating layer for protecting said first recording layer, the laser beam parts being transmitted through said first dielectric layer, and a second dielectric layer formed under said second coating layer for protecting said second recording layer, the laser beam parts being transmitted through said second dielectric layer.

* * * * *